US009605563B2

(12) United States Patent
Chardonnet et al.

(10) Patent No.: US 9,605,563 B2
(45) Date of Patent: Mar. 28, 2017

(54) METHOD AND TOOLING FOR ASSEMBLING A GUIDE VANE STAGE

(71) Applicant: SNECMA, Paris (FR)

(72) Inventors: Romain Rene Marcel Chardonnet, Alfortville (FR); Patrick Gilbert Petit, Maisse (FR); Alain Martinez, Corbeil Essonnes (FR)

(73) Assignee: SNECMA, Paris (FR)

( * ) Notice: Subject to any disclaimer, the term of this patent is extended or adjusted under 35 U.S.C. 154(b) by 96 days.

(21) Appl. No.: 14/391,794

(22) PCT Filed: Apr. 12, 2013

(86) PCT No.: PCT/FR2013/050800
§ 371 (c)(1),
(2) Date: Oct. 10, 2014

(87) PCT Pub. No.: WO2013/156715
PCT Pub. Date: Oct. 24, 2013

(65) Prior Publication Data
US 2015/0052750 A1    Feb. 26, 2015

(30) Foreign Application Priority Data

Apr. 16, 2012   (FR) .................................... 12 53493

(51) Int. Cl.
*F01D 25/28* (2006.01)
*F01D 9/04* (2006.01)
(Continued)

(52) U.S. Cl.
CPC ............ *F01D 25/285* (2013.01); *B23K 31/02* (2013.01); *B23P 6/002* (2013.01); *F01D 9/04* (2013.01);
(Continued)

(58) Field of Classification Search
CPC .. B23P 15/04; F05D 2230/23; F05D 2230/30; F05D 2230/51; F05D 2230/52;
(Continued)

(56) References Cited

U.S. PATENT DOCUMENTS 7,147,434 B2 * 12/2006 Mons ...................... F01D 9/042
29/458
2002/0076320 A1   6/2002 Glover et al.
(Continued)

FOREIGN PATENT DOCUMENTS

EP    1 219 785 A1   7/2002
EP    1 908 923 A1   4/2008
FR    2 958 323 A1   10/2011

OTHER PUBLICATIONS

International Search Report issued Jun. 11, 2013 in PCT/FR2013/050800 filed Apr. 12, 2013.

*Primary Examiner* — Christopher Besler
(74) *Attorney, Agent, or Firm* — Oblon, McClelland, Maier & Neustadt, L.L.P.

(57) ABSTRACT

A method and tooling for assembling a guide vane stage that includes an inner shroud and an outer shroud that are coaxial and interconnected by radial airfoils, the method including holding plates pressed against an outer surface of the inner shroud so that the plates cover gaps formed between openings in the inner shroud and the airfoils at least in part and in a manner that is leaktight, and applying a sealing resin to the inner surface of the inner shroud so that the resin fills the gaps and so that radially inner ends of the airfoils are embedded in the resin.

7 Claims, 4 Drawing Sheets (51) Int. Cl.
 B23K 31/02 (2006.01)
 B23P 6/00 (2006.01)
(52) U.S. Cl.
 CPC ........ F01D 9/044 (2013.01); *B23K 2201/001* (2013.01); *F05D 2230/60* (2013.01); *F05D 2230/64* (2013.01); *Y10T 29/49323* (2015.01); *Y10T 29/53913* (2015.01)
(58) Field of Classification Search
 CPC ............ F05D 2230/60; F05D 2230/64; F01D 25/285; F01D 9/04; F01D 9/044
 See application file for complete search history.

(56) References Cited

U.S. PATENT DOCUMENTS

| | | | |
|---|---|---|---|
| 2004/0033137 A1* | 2/2004 | Glover | F01D 9/042 |
| | | | 416/204 R |
| 2004/0213673 A1 | 10/2004 | Tsuru et al. | |
| 2008/0075588 A1 | 3/2008 | Belmonte et al. | |
| 2010/0254804 A1* | 10/2010 | Harper | F01D 9/042 |
| | | | 415/119 |
| 2011/0243742 A1 | 10/2011 | Dezouche et al. | |

* cited by examiner

METHOD AND TOOLING FOR ASSEMBLING A GUIDE VANE STAGE

BACKGROUND OF THE INVENTION

Field of the Invention

The present invention relates to a method and to tooling for assembling a guide vane stage, in particular for a low pressure compressor of a turbine engine.

Description of the Related Art

In a turbine engine compressor, a guide vane stage comprises two axial shrouds extending one inside the other and interconnected by substantially radial airfoils that are fastened via their radial ends to the shrouds.

The outer shroud of the guide vane stage has radial orifices in which the radially outer ends of the airfoils are engaged and fastened, generally by welding. The inner shroud includes radial orifices in which the radially inner ends of the airfoils are engaged with clearance gaps, these gaps presenting a width lying in the range 2 millimeters (mm) to 3 mm, approximately.

In the prior art, the inner ends of the airfoils are secured to the inner shroud by means of a polymerizable sealing resin that is applied to the inner surface of the inner shroud and that, after hardening, serves to fasten the airfoils to the inner shroud. The resin forms an annular lock inside the inner shroud with the radially inner ends of the airfoils being embedded therein and with its internal periphery defining an abradable track for co-operating with annular wipers of a rotor in order to form a labyrinth type seal.

Prior to applying the resin to the inner shroud, the resin is injected into the above-mentioned gaps between the airfoils and the edges of the orifices in the inner shroud, all around each of the airfoils. This serves to fill in the gaps in advance so as to avoid any resin subsequently passing through the gaps while it is being applied to the inner shroud (so as to avoid wasting resin and so as to limit the time required for cleaning the guide vane stage in order to eliminate any runs of resin). Resin is injected into the gaps by means of a syringe that is filled by an operator, with this injection step being lengthy and expensive (taking about 8 hours for a single guide vane stage), difficult, messy, and difficult to make reproducible. In order to limit runs of resin while it is being applied, it is possible to store the resin in a refrigerator prior to applying it so as to increase its viscosity. Nevertheless, although that makes it easier to put the resin into place, it makes managing batches of resin more complex.

BRIEF SUMMARY OF THE INVENTION

The present invention provides a solution to this problem that is simple, effective, and inexpensive.

To this end, the invention provides a method of mounting a guide vane stage comprising an inner shroud and an outer shroud that are coaxial, being interconnected by substantially radial airfoils, the method being characterized in that it comprises the steps consisting in:

a) engaging the radially outer ends of the airfoils in orifices in the outer shroud, and engaging the radially inner ends of said airfoils with clearance gaps in orifices in the inner shroud;

b) fastening the outer ends of the airfoils to the outer shroud, e.g. by welding;

c) holding plates bearing against the outer surface of the inner shroud so that the plates cover the gaps formed between the openings in the inner shroud and the airfoils at least partially and in leaktight manner, the plates being positioned circumferentially between the airfoils; and d) applying a sealing resin to the inner surface of the inner shroud in such a manner that the resin fills the above-mentioned gaps and the radially inner ends of the airfoils are embedded in the resin.

In this way, while it is being applied to the inner surface of the inner shroud, the resin fills in the gaps formed between the openings in the inner shroud and the airfoils, but without overflowing onto the outer surface of the inner shroud, because of the presence of the plates that close those gaps in leaktight manner.

The invention makes it possible to eliminate the prior art step that consists in injecting the resin by means of a syringe into the above-mentioned gaps prior to applying the sealing resin to the inner surface of the shroud. That injection step, which is awkward and difficult to perform, is replaced by a step that is simpler and much quicker of putting plates into position and maintaining them pressed against the outer surface of the inner shroud.

Preferably, the sealing resin is based on silicone, e.g. being of the room temperature vulcanization (RTV) type.

According to a characteristic of the invention, during step c), tooling is placed circumferentially between the airfoils, each piece of tooling comprising an inner plate coming to bear against the outer surface of the inner shroud and an outer bearing member, such as an outer plate, coming to bear against the inner surface of the outer shroud, resilient means being arranged between the inner plate and the outer bearing member so as to constrain the inner plate to bear against the inner shroud.

Advantageously, each piece of tooling is capable of occupying an introduction position in which the inner plate and the outer bearing member are moved towards each other against the resilient means, and a assembly position in which the inner plate and the outer bearing member are moved apart from each other with the help of the resilient means so as to constrain the inner plate to bear against the inner shroud.

Each inner plate may also have two lateral edges matching the shapes of the pressure side and suction side surfaces of the two corresponding adjacent airfoils.

Furthermore, each inner plate may include at least one positioning abutment that comes to bear against a trailing edge or a leading edge of one of the corresponding adjacent vanes.

This characteristic facilitates and guarantees proper positioning of the plates relative to the airfoils.

The invention also provides tooling for use in assembling a turbine engine guide vane stage, the tooling comprising an inner bearing plate and an outer bearing member, such as for example an outer bearing plate, that are connected together by at least one spacer of length that is adjustable between an insertion position in which the inner plate and the outer bearing member are moved towards each other, and a assembly position in which the inner plate and the outer bearing member are spaced apart from each other, resilient means tending to space the inner plate and the outer bearing member apart in the assembly position.

Preferably, the inner plate is covered in a layer of deformable material, e.g. of silicone foam, so as to avoid any damage to the inner shroud against which it is to bear.

The spacer may comprise two tubular portions that are slidably mounted one in the other, one of said portions including a stud mounted to be movable in an opening in the other one of said portions, said opening including a zone in which the stud can slide freely, which zone extends along the sliding axis and is extended by at least one zone for locking the stud, which zone extends perpendicularly to the sliding zone.

Thus, prior to mounting the tooling between the inner and outer shrouds of the guide vane stage, the spacer is retracted and the stud is received in the locking zone so as to prevent one of the portions from sliding relative to the other. Once the tooling has been put into place, the stud is extracted from the locking zone and put into the sliding zone in which the two portions can slide freely under drive from the resilient means that tend to press the inner plate against the outer surface of the inner shroud and to press the outer bearing member against the inner surface of the outer shroud.

The outer bearing member may also be in the form of an outer plate covered in a layer of deformable material, e.g. silicone foam, so as to avoid any damage to the outer shroud against which the outer plate comes to bear.

BRIEF DESCRIPTION OF THE SEVERAL VIEWS OF THE DRAWINGS

The invention can be better understood and other details, characteristics, and advantages of the invention appear from reading the following description made by way of non-limiting example and with reference to the accompanying drawings, in which.

DETAILED DESCRIPTION OF THE INVENTION

Figure 1:
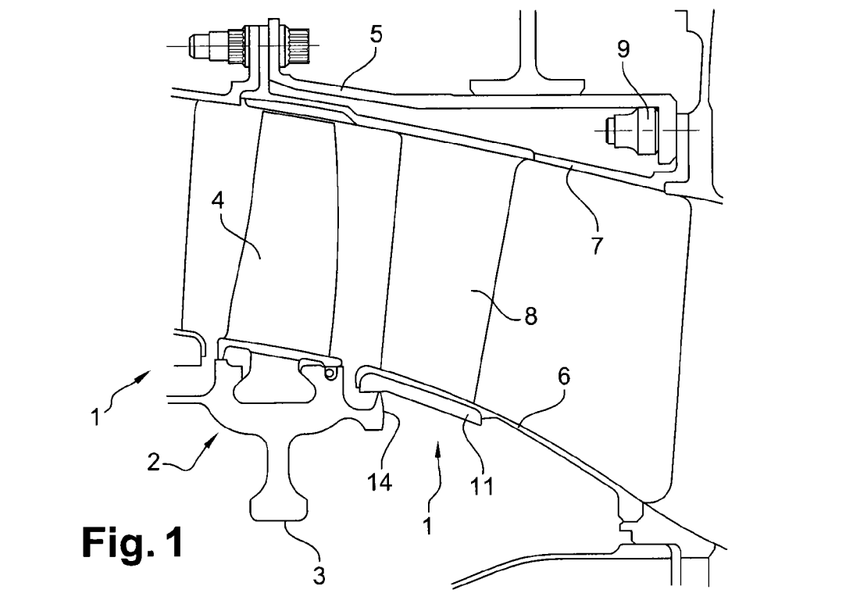
FIG. 1 is a fragmentary diagrammatic half-view in axial section of a turbine engine compressor, including a guide vane stage.

Reference is made initially to FIG. 1 which shows a low pressure compressor of a turbine engine such as an airplane turboprop or turbojet, the compressor comprising guide vane stages 1 having rotor wheels 2 mounted between them.

Each rotor wheel 2 comprises a disk 3 carrying an annular row of substantially radial blades 4 at its periphery and surrounded by a compressor casing 5.

Each guide vane stage 1 comprises two shrouds, respectively an inner shroud 6 and an outer shroud 7, with an annular row of substantially radial airfoils 8 extending between them, the outer shroud 7 being fastened to the casing 5 by nut-and-bolt type means 9.

Figure 2:
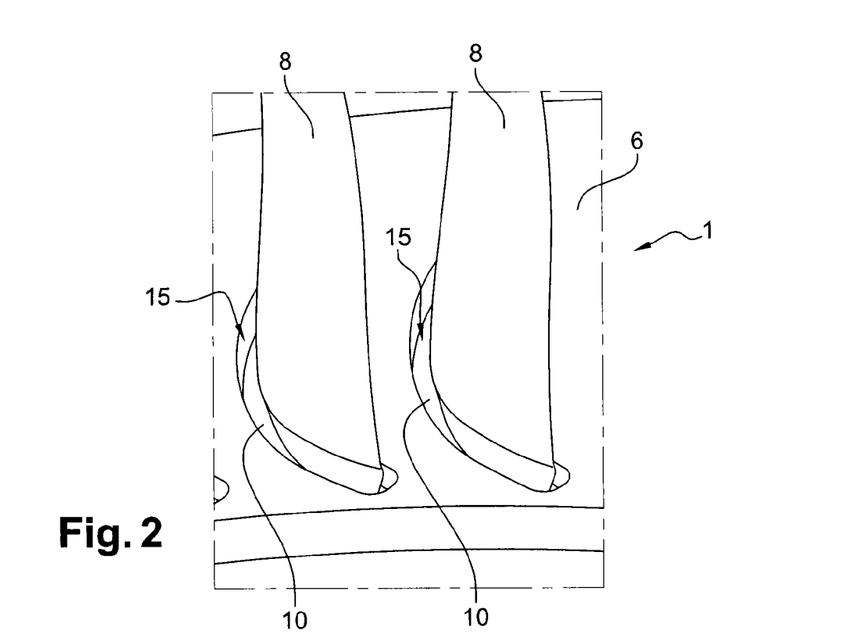
FIG. 2 is a fragmentary diagrammatic view in perspective of the inner shroud and of the airfoils of the FIG. 1 guide vane stage.

The radially outer ends of the airfoils are welded to the outer shroud 7. The radially inner ends of the airfoils are engaged, with clearance gaps, in orifices 10 in the inner shroud 6 (FIG. 2) and they are secured to the inner shroud 6 by applying a polymerizable sealing resin 11 to the radially inner surface 12 of the inner shroud 6 (FIG. 4), with the radially inner ends of the airfoils 8 being embedded in the sealing resin.

A bonding primary may be applied to the inner surface 12 of the inner shroud 6 prior to applying the sealing resin 11.

After hardening, the sealing resin 11 forms an annular lock inside the inner shroud 6, with the inner periphery of this lock defining an abradable track 13 suitable for co-operating with an annular wiper 14 carried by the disk of a rotor wheel 2 in order to form a labyrinth type seal (FIG. 1).

Figure 3:
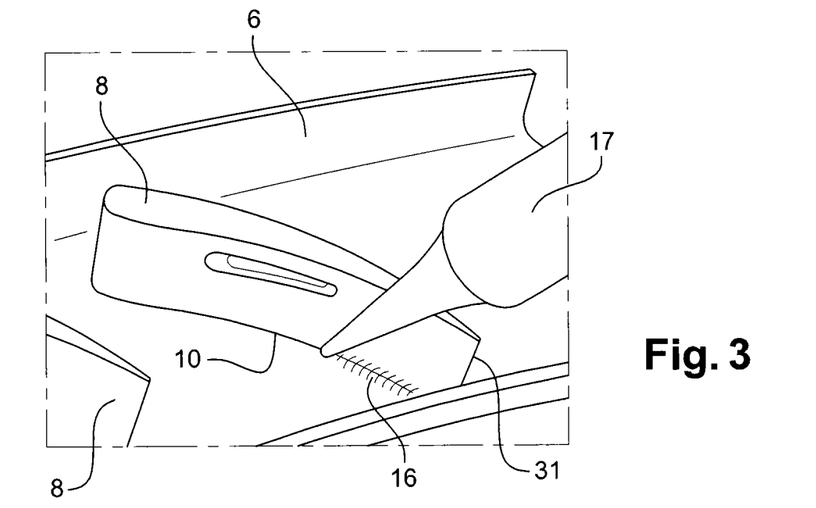
FIG. 3 is a fragmentary diagrammatic view in perspective of the inner shroud and of airfoils of a prior art guide vane stage, and it shows a step in the fabrication of that stage.
Figure 4:
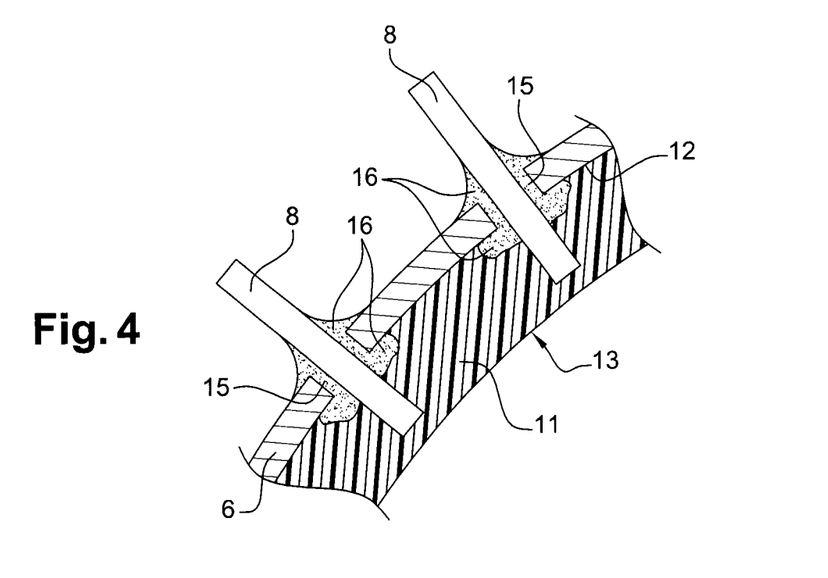
FIG. 4 is a fragmentary diagrammatic view in axial section of the inner shroud and of airfoils of the FIG. 1 guide vane stage, once fabrication has been terminated.

In the prior art, the step of applying the sealing resin is preceded by a step of injecting the resin into the above-mentioned gaps 15, this step being shown diagrammatically in FIGS. 3 and 4.

The resin 16 is injected by means of a syringe 17 that is filled and handled by an operator. The resin 16 is injected into the gaps 15 all around the airfoils 8 so as to fill in the gaps 15 and subsequently prevent resin 11 from passing through the gaps 15 while it is being applied to the inner surface 12 of the inner shroud 6.

Nevertheless, as explained above, that injection step presents numerous drawbacks.

In order to remedy them, the invention proposes using tooling 18 of structure that is described below with reference to FIGS. 5 to 8.

Figure 5:
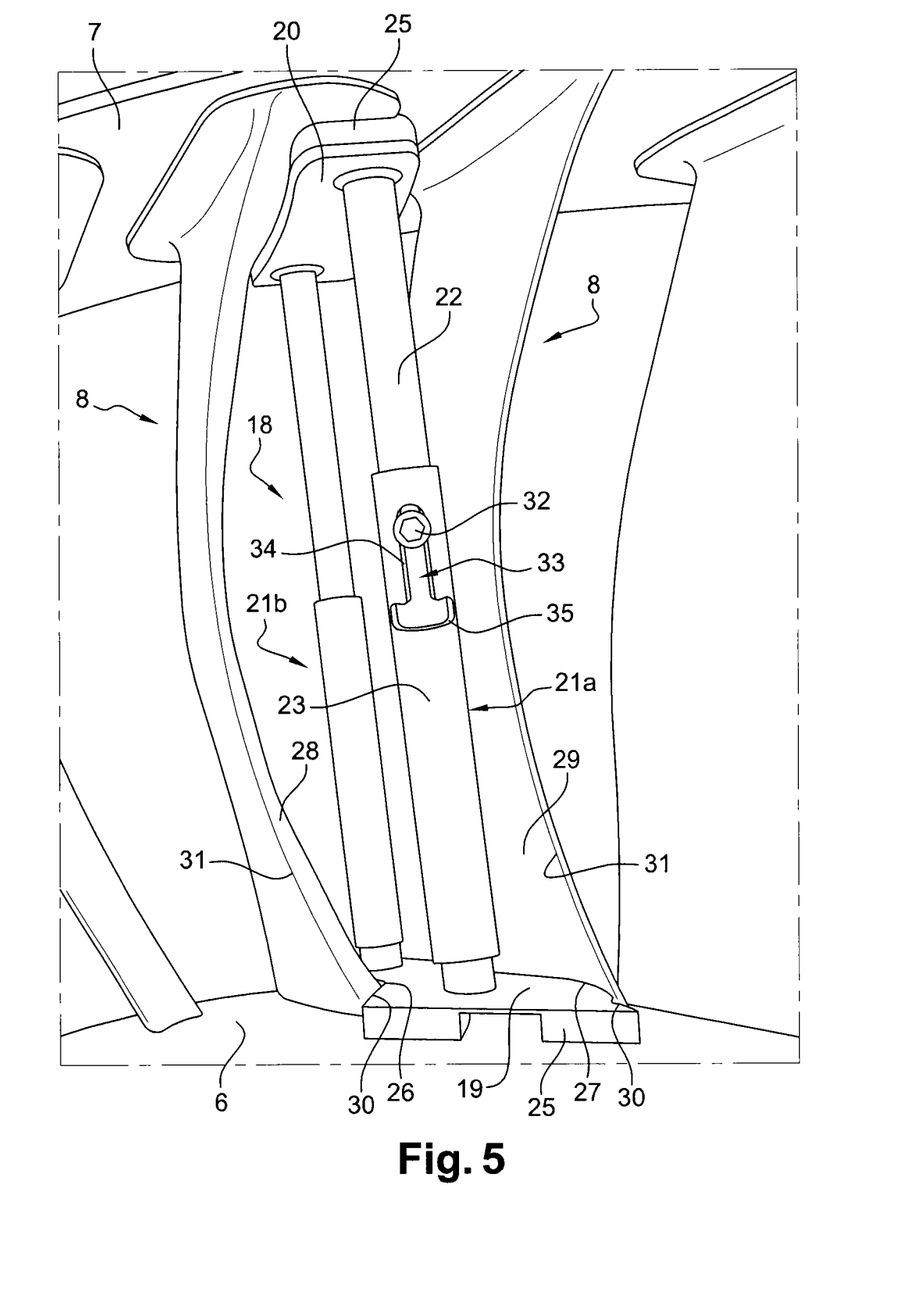
FIG. 5 is a perspective view showing the tooling of the invention mounted between the inner and outer shrouds of the guide vane stage.
Figures 6, 7, 8:
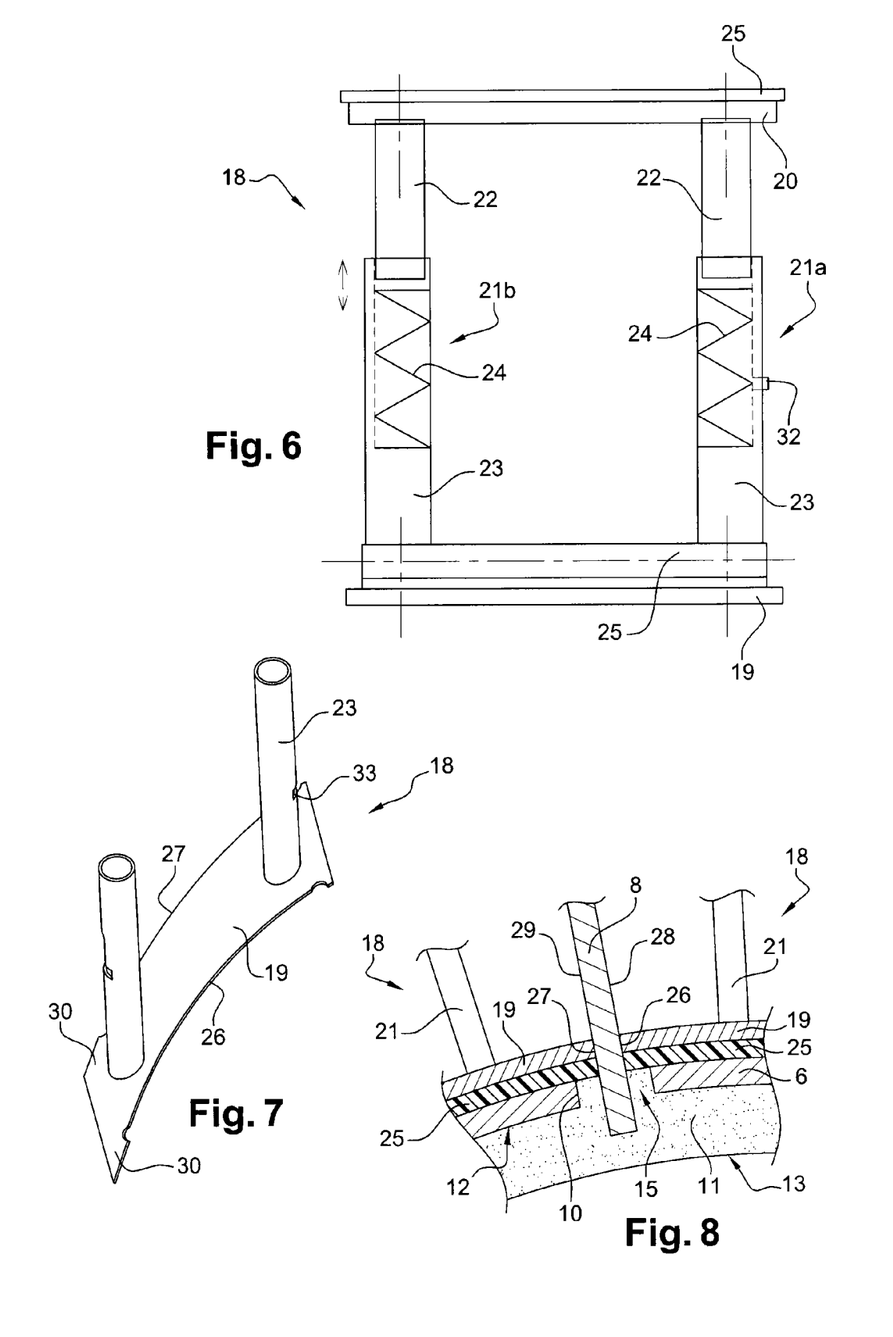
FIG. 6 is a diagrammatic view of the tooling of the invention.
FIG. 7 is a perspective view of a portion of the tooling.
FIG. 8 is a fragmentary diagrammatic view in axial section of a portion of the guide vane stage having tooling in accordance with the invention mounted thereon.

Each piece of tooling 18 comprises an inner bearing plate 19 and an outer bearing plate 20 connected together by two telescopic spacers 21a, 21b, each comprising two tubular movable portions 22, 23 that are slidably mounted one in the other so as to be movable between an insertion position in which the inner and outer plates 19 and 20 are moved towards each other, and an assembly position in which the inner and outer plates 19 and 20 are spaced apart from each other, resilient means 24 tending to space the two plates 19 and 20 apart into the assembly position.

The tubular portions 23, 22 are fastened to the inner and outer plates 19, 20, e.g. with the help of screws (not shown).

Each plate 19, 20 may be covered in full or in part in a layer 25 of deformable material, e.g. a silicone foam. By way of example, it is possible to use a foam known under the trademark COHRlastic F-12 from the supplier Saint-Gobain Performance Plastics SA.

The layer 25 of deformable material has thickness that lies in the range 4 mm to 6 mm, for example.

Each inner plate 19 has two lateral edges 26, 27 of shapes that are designed to match the shapes of the pressure side and suction side surfaces 28 and 29 of two adjacent airfoils 8.

Each lateral edge 26, 27 also includes a zone 30 projecting in the plane of the plate that is to bear against a trailing edge 31 or a leading edge of the corresponding airfoil 8, so as to constitute a positioning abutment for positioning the tooling 18.

The inner tubular portion 22 of one of the spacers 21a includes a stud, e.g. formed by a screw 32 that is mounted in an opening 33 in the outer tubular portion 23.

This opening 33 includes a zone 34 in which the stud 32 can slide freely, which zone extends along the sliding axis, i.e. along the axis of the tubular portions 22, 23, and it is extended at its end close to the inner plate 19 by at least one locking zone 35 extending perpendicularly to the sliding zone 34, either on one side only of the sliding zone 34, or on both sides of this zone 34, as shown in FIG. 5.

The outer tubular portion 23 including the opening 33 is mounted to pivot about the inner tubular portion 22 that carries the stud 32.

Together, these two tubular portions 22, 23, the stud 32, and the opening 33 thus constitute a bayonet system enabling the spacer 21a to be locked in its insertion or retracted position (i.e. when the stud 32 is engaged in the zone 35 of the opening 33), in which the two plates 19 and 20 are moved towards each other against the return force of the resilient means 24, or on the contrary they allow the two plates 19 and 20 to be moved apart from each other (when the stud 32 is engaged in the zone 34 of the opening 33).

There follows a description of the method of assembling a guide vane stage 1 of the invention, regardless of whether or not it is sectorized.

As mentioned above, the guide vane stage 1 includes an inner shroud 6 and an outer shroud 7 that are coaxial and that are connected together by substantially radial airfoils 8.

The method of the invention consists initially in engaging the radially outer ends of the airfoil 8 in orifices in the outer shroud 7 and engaging the radially inner ends of said airfoils 8 with clearance gaps 15 in orifices 10 in the inner shroud 6.

The outer ends of the airfoils 8 are then welded to the outer shroud 7.

Thereafter, the tooling 18 is engaged between the inner and outer shrouds 6 and 7, and circumferentially between the airfoils 8. During this engagement stage, the studs 32 are engaged in the locking zones 35 of the openings 33 so that the spacers 21a, 21b are held in the insertion position.

Also during this engagement stage, the inner plates 19 of the tooling are engaged so that the abutments 30 come to bear against the leading edges 31 of the trailing edges of the airfoils 8.

Thereafter the operator turns the outer tubular portions 23 of the spacers 21a in question so that the studs 32 engage in the sliding zones 34 of the openings 33. The resilient means 24 then urge the spacers 21a, 21b into their assembly position (or deployed position) so as to press the inner and outer plates 19 and 20 respectively against the outer surface of the inner shroud 6 and against the inner surface of the outer shroud 7. Under the effect of the return force, the layers 25 of silicone foam tend to deform a little, in particular so that the lateral edges 26, 27 of the inner plates 19 fit in leaktight manner against the pressure side and suction side surfaces 28, 29 of the corresponding airfoils 8.

In contrast, the lateral edges of the outer plate 20 are spaced apart from the pressure side and suction side surfaces 28 and 29 of the airfoils 8, as can be seen more clearly in FIG. 5.

The forces generated by the resilient means 24 may lie for example in the range 2.5 kilograms (kg) to 3 kg per spacer.

At this instant, the inner plates 19 cover the gaps 15 formed between the openings 10 in the inner shroud 6 and the airfoils 8 in a manner that is leaktight and complete (or almost complete).

A layer of polymerizable sealing resin 11 is then applied to the radially inner surface of the inner shroud (FIG. 8). The resin penetrates into the above-mentioned gaps 15 while the radially inner ends of the airfoils 8 are likewise embedded in the resin 11.

Because of the presence of the inner plates 19 and of the layers 25, the resin flows little or not at all beyond the gaps 15 over the outer surface of the inner shroud 6.

The resin 11 is then raised to a temperature of 120° C. in a stove for a period of two hours.

After setting, the sealing resin 11 forms an annular lock inside the inner shroud 6, the inner periphery 13 of the lock defining an abradable track for co-operating with an annular wiper 14 carried by the disk 3 of a movable blade stage 2 in order to form a labyrinth type seal.

The inner and outer plates 19, 20 of the tooling 18 are then once more moved towards each other, and the studs 32 are moved into the locking zones 35 in the opening 33 by turning the corresponding outer tubular portions 23. The tooling 18 can then be extracted from the guide vane stage 1.

The time required for putting a piece of tooling 18 into place and for removing it may be estimated to lie in the range 10 seconds (s) to 20 s.

The invention claimed is:

1. A method of mounting a guide vane stage including an inner shroud and an outer shroud that are coaxial, being interconnected by substantially radial airfoils, the method comprising:
   a) engaging radially outer ends of the airfoils in orifices in the outer shroud, and engaging radially inner ends of the airfoils with clearance gaps in orifices in the inner shroud;
   b) fastening or welding the outer ends of the airfoils to the outer shroud;
   c) holding plates bearing against an outer surface of the inner shroud so that the plates cover the clearance gaps formed between the orifices in the inner shroud and the airfoils at least partially and in leaktight manner; the plates being positioned circumferentially between the airfoils;
   d) applying a sealing resin to an inner surface of the inner shroud such that the resin fills the gaps and the radially inner ends of the airfoils are embedded in the resin; and
   e) removing the plates after applying the sealing resin.

2. A method according to claim 1, wherein the sealing resin is based on silicone, or is of room temperature vulcanization type.

3. A method according to claim 1, wherein during c), tooling is placed circumferentially between the airfoils, each piece of tooling including an inner plate coming to bear against the outer surface of the inner shroud and an outer bearing member, or an outer plate, coming to bear against the inner surface of the outer shroud, and resilient means being arranged between the inner plate and the outer bearing member to constrain the inner plate to bear against the inner shroud.

4. A method according to claim 3, wherein each piece of tooling is configured to occupy an introduction position in which the inner plate and the outer bearing member are moved towards each other against the resilient means, and an assembly position in which the inner plate and the outer bearing member are moved apart from each other with help of the resilient means to constrain the inner plate to bear against the inner shroud.

5. A method according to claim 4, wherein each inner plate includes two lateral edges matching shapes of pressure side and suction side surfaces of two corresponding adjacent airfoils.

6. A method according to claim 3, wherein each inner plate includes at least one positioning abutment that comes to bear against a trailing edge or a leading edge of one of the corresponding adjacent airfoils.

7. A method of mounting a guide vane stage including an inner shroud and an outer shroud that are coaxial, being interconnected by substantially radial airfoils, the method comprising:

engaging radially outer ends of the airfoils in orifices in the outer shroud, and engaging radially inner ends of the airfoils with clearance gaps in orifices in the inner shroud;

fastening or welding the outer ends of the airfoils to the outer shroud;

providing a tooling, the tooling including
- an outer plate and an inner plate connected by spacers which are movable between an insertion position and an assembly position, the outer and inner plates being spaced further apart from each other in the assembly position than in the insertion position, the inner plate including a first lateral edge matching a shape of a pressure side surface of the airfoils and a second lateral edge matching a shape of a suction side surface of the airfoils, and
- resilient means which constrain the outer plate and the inner plate in the assembly position;

placing the tooling in the insertion position between the inner and outer shrouds and circumferentially between the airfoils;

setting the tooling in the assembly position such that the inner plate of the tooling abuts against an outer surface of the inner shroud so that the inner plate covers one of the clearance gaps formed between one of the orifices in the inner shroud and one of the airfoils and the first and second lateral edges of the inner plate are fitted at least partially and in leaktight manner against the pressure side surface and the suction surface of corresponding adjacent airfoils, respectively;

applying a sealing resin to an inner surface of the inner shroud such that the resin fills the one of the clearance gaps and one of the radially inner ends of the airfoils is embedded in the resin; and then removing the tooling.

* * * * *

UNITED STATES PATENT AND TRADEMARK OFFICE
CERTIFICATE OF CORRECTION

PATENT NO. : 9,605,563 B2
APPLICATION NO. : 14/391794
DATED : March 28, 2017
INVENTOR(S) : Romain Rene Marcel Chardonnet et al.

It is certified that error appears in the above-identified patent and that said Letters Patent is hereby corrected as shown below:

Column 6, Line 61, change "at least one positioning" to --a positioning--.

Signed and Sealed this
Seventeenth Day of July, 2018

Andrei Iancu
*Director of the United States Patent and Trademark Office*